United States Patent Office 3,432,559
Patented Mar. 11, 1969

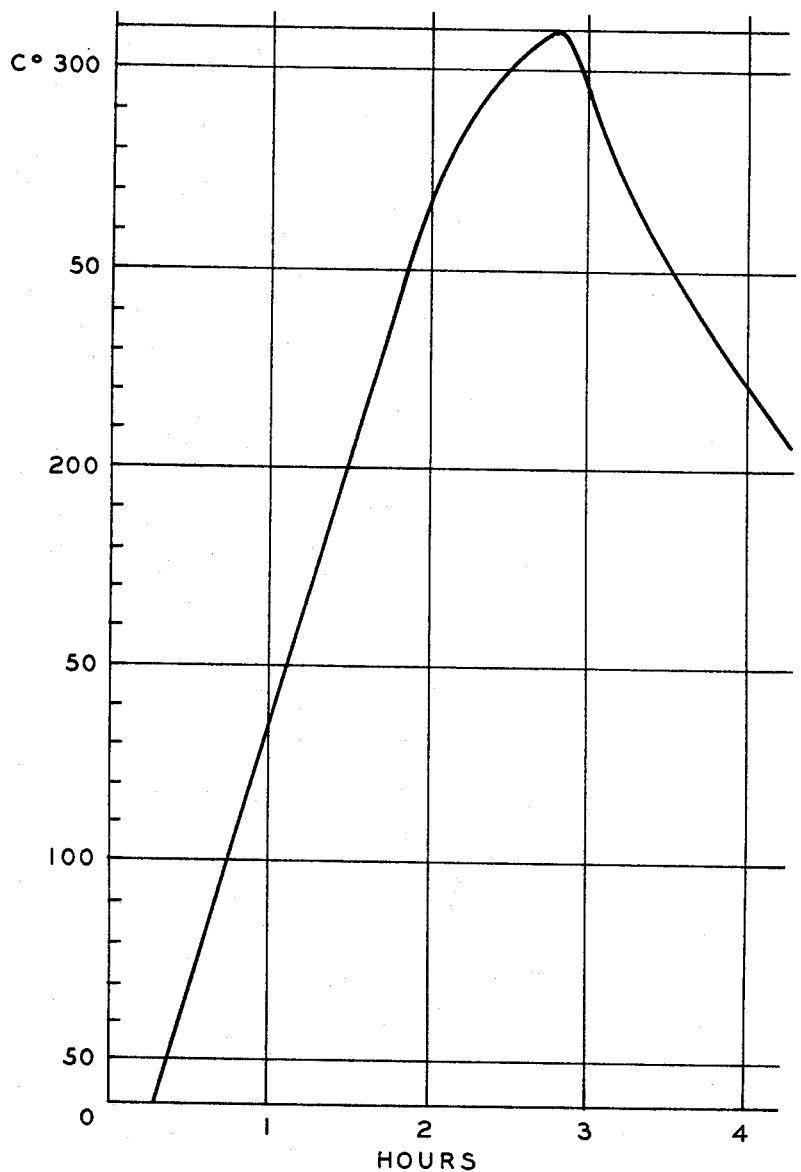

3,432,559
PROCESS FOR PREPARING QUATERNARY
PHOSPHONIUM HALIDES
Ludwig Maier, Zurich, Switzerland, assignor to Monsanto
Company, St. Louis, Mo., a corporation of Delaware
Filed May 25, 1966, Ser. No. 552,849
Claims priority, application Switzerland, June 4, 1965,
7,974/65
U.S. Cl. 260—606.5     9 Claims
Int. Cl. C07f 9/54, 9/02

The present invention relates to a process for preparing quaternary phosphonium halides of the general formula $$[R_4P]^+X^-$$

wherein R signifies a methyl, ethyl or propyl group and X a chlorine, bromine or fluorine atom.

The prior art is summarized in Topics in Phosphorus Chemistry, volume 1, page 10, lines 21–40 (1964) by M. M. Rauhut as follows:

Reactions of white or red phosphorus with alkyl iodides at elevated temperatures in solution proceed further than reactions with the corresponding bromides and chloride so that the products contain units having three or four alkyl groups bonded to phosphorus. While the identity of the initial product has not been established, the properties of the black semisolid material obtained from the reaction suggest a mixture of the corresponding trialkyldiiodophosphorane and the quaternary phosphonium triiodide.

$$RI + P \rightarrow R_3PI_2 + R_4P^+I^-$$

The quaternary phosphonium iodide, $R_4P^+I^-$, can be isolated after treatment of the reaction product with aqueous hydrogen sulfide. Thus, white phosphorus heated with excess ethyl iodide at 180° for 22 hr. gave a product from which tetraethylphosphonium iodide was obtained in 49% yield. The remainder of the phosphorus was said to be converted to triethylphosphine oxide, although this product was not isolated. When the reaction product is refluxed with ethanol and then distilled over potassium hydroxide, the major product is the trialkyl phosphine oxide. Both trialkyldiiodophosphoranes and quaternary phosphonium iodides would be converted to the tertiary phosphine oxide under these conditions.

There is believed to be an error in the formula above in that it is not consistent with the immediate previous literal statement, which would indicate that $R_4P^+I^-$ should be $R_4P^+I^-3$, and this is also consistent with the basic article (C. Masson and J. B. Kirkland, J. Chem. Soc. 55, 135, 1889), which shows the reaction as follows:

$$2P + 7C_2H_5I = P(C_2H_5)_4I_3 + P(C_2H_5)_3I_4$$

The previously used process for preparing quaternary phosphonium halides corresponding to the above mentioned formula, is based on the reaction of tertiary phosphines with a hydrocarbon halide.

It is also known that the corresponding dimethylhalogenophosphines are formed in addition to methyldihalogenophosphines on passing hydrocarbon halides over phosphorus at higher temperatures, e.g. methyl chloride or methyl bromide over red phosphorus at 320° to 380° C. However, quaternary phosphonium halides cannot be produced by this process.

It has been found that the corresponding quaternary phosphonium halides can be produced in excellent yields from white phosphorus and a lower alkyl halide having 1 to 3 carbon atoms, such as methyl chloride, methyl bromide, ethyl chloride, ethyl bromide, n-propyl chloride, n-propyl bromide, iso-propyl chloride and iso-propyl bromide. The respective fluorides can also be used, but are less preferred.

Extensive investigations have given the results compiled in Tables I and IV. The following facts are apparent: Below 200° C. no reaction occurs between $P_W$ and $CH_3Cl$ (run 1). Between 200° and 228° C. the reaction is still slow and only a 52% conversion of $CH_3Cl$ was obtained after a heating period of 10 hours (run 2). At 230° C. a quantitative conversion of $CH_3Cl$ was achieved but the heating time required to bring the reaction to completion was still 10 hours. The yield of $[(CH_3)_4P]^+Cl^-$ was high (88%, run 3). At 250° C. a quantitative conversion of $CH_3Cl$ was obtained after a heating period of 5 hours (89%, run 4). At 300° to 310° C. the reaction proceeds much faster and a 92 to 95.5% conversion of $CH_3Cl$ was obtained after a heating period of 2½ hours. The yield of $[(CH_3)_4P]^+Cl^-$ was high (87%, run 5, 93%, run 14). The rate of heating is shown in the graph. The heating up time is included in the indicated heating periods.

In the ideal case the overall reaction conforms with the equation $$2P + 4RX \rightarrow [R_4P]^+X^- + PX_3$$

In general, some alkyldihalophosphine is also formed, whereas dialkylhalophosphines cannot be found in significant amounts. The ratio of phosphorus to alkyl halide does not seem to be critical. Thus, comparable yields of the quaternary phosphonium salts can be obtained using ratios of P:alkyl halide in the range of 1:1.1 to 1:2.3 (runs 4, 8, 10, 11). However, the alkyl halide or the phosphorus can be present in large excess. It has been found that the intermediate dialkylhalophosphine in alkylated by the alkyl halide at a much faster rate than white phosphorus, and also the intermediate alkyldihalophosphine is alkylated at least at the same, but more probably at a faster rate than white phosphorus.

The yield determining parameters are mainly the reaction temperature and the heating time. Depending on these conditions the ratio of the products can vary widely. Thus, there can be obtained e.g. $[(CH_3)_4P]^+Cl^-$ in yields varying from 60 to 100%; $CH_3PCl_2$ in yields varying from 4 to 23% and $PCl_3$ in yields varying from 11 to 47%, based on $CH_3Cl$ used up in the reaction. The addition of $PCl_3$ to the reaction mixture has little effect on the course of the reaction (run 10).

For making tetramethylphosphonium chloride in high yield the proportion P:methyl chloride lies expediently in the range of 1:1 to 1:3, and preferably 1:1.1 to 1:2, maintaining a reaction temperature of about 250° to 260° C. for about 3½ hours. The other halides especially the bromides will react easier and consequently the reaction temperature can be lower or the reaction time shorter with halides other than chlorides.

It is clear that when alkyldihalogenophosphines and possibly also dialkylhalogenophosphines are formed, they can be converted after separation by reacting with alkyl halide either alone or together with white phosphorus in another batch, so the yields based on the consumed alkyl halide are finally quantitative as long as pyrrolytic decomposition which appears upon too long heating at above 300° C. is avoided. Also any phosphorus remaining after extraction of the distillation residue, which generally is contaminated with halogen compound and carbon, can be used again.

Reaction temperature up to about 400° C. can be used when the residence time of the reactants is conveniently short. In such cases, the alkyl halide can be introduced at higher temperature (e.g. at 300° to 315° C.) and the mixture heated for a shorter period of time, e.g. 2½ hours, when the alkyl halide is e.g. methyl chloride. At still higher temperature (e.g. at 350° to 400° C.) the reaction mixture is continuously passed through the heating zone, selecting an appropriate speed of passage, i.e. residence time.

The reaction is expediently carried out under pressure. When an autoclave or other apparatus made of iron is used it should normally be lined in order to avoid the reaction mixture coming into contact with iron or dissolved iron coming into the reaction mixture, since it has been found that the presence of iron decreases the yield of quaternary phosphonium salts.

A further feature of the present invention involves the spraying of the white phosphorus into an autoclave at a temperature above about 250° C.

The quaternary phosphonium halides obtainable by the present process can be used to make flame-proofed materials such as e.g. paper and textiles. Owing to their good solubility in certain organic solvents they can serve as electrolyte salts. Thermal or electrolytic decomposition yields tertiary phosphines, whereas the alkaline decomposition leads to the tertiary phosphine oxides. The quaternary phosphonium halides are useful in the preparation of complex salts and for many other purposes.

Example 1

The experiments which are summarized in the following Tables I–IV have been carried out in thick-walled glass tubes (Pyrex) with 100 ml. content each. Tubes containing 4 g. each of white phosphorus were evacuated and heated up to 50° C. in order to eliminate traces of water and cause the phosphorus to melt. Then the tubes were cooled with liquid nitrogen, and after having condensed into each tube the calculated quantity of alkyl chloride (e.g. 7.5 g. methyl chloride in run No. 4) they were sealed under vacuum. After the tubes had reached room temperature they were put into an iron tube and heated in a furnace. The temperature of the furnace reached, e.g. after a heating time of 10 minutes, 250° C. This temperature was maintained, e.g. in run No. 4 for 190 minutes and then the furnace was switched off. The temperature decreased to about 230° C. within half an hour and to about 170° C. within another hour. The tubes were taken out of the furnace when they reached about room temperature, they were cooled with liquid nitrogen, opened and connected to a high vacuum system. The volatile products were collected in a trap which was cooled with liquid nitrogen, as the tubes were heated up to 100° C. The crude distillates were redistilled and the fractions obtained e.g. by using methyl chloride, boiling in the range of 72–83° C. were collected.

In run No. 4 the repeated distillation of the crude distillate (9.8 g.) yielded a colorless liquid (9.0 g.); B.P. 74.5–75.5° C./722 mm., $d_D^{20} = 1.4302$. The distillates of the various runs were examined each by $P^{31}$ NMR analysis to determine the composition. The values are indicated in the Tables III and IV. In run No. 4 the liquid consisted of 58.7% of $PCl_3$ and 41.3% of $CH_3PCl_2$; no methyl chloride was recovered and therefore a total conversion of the methyl chloride used or consumed was accomplished in this case.

The distillation residues were extracted with alcohol. In run No. 4 there were obtained 4.6 g. of an insoluble red-black residue and 8.4 g. (89.3%) of tetramethylphosphonium chloride $[(CH_3)_4P]^+Cl^-$. By calculating the phosphorus content in the isolated products of reaction and subtracting it from the utilized quantity it was found that in this case the insoluble residue (4.6 g.) consisted of 3.77 g. of red phosphorus and 0.82 g. of carbon plus halogen compound ($Cl^-$ was qualitatively identified). The tetramethylphosphonium chloride obtained was analyzed.

*Analysis.*—$C_4H_{12}ClP$, Calc'd percent: C, 37.95; H, 9.56; Cl, 28.01. Found percent: C, 38.14; H, 9.52; Cl, 27.70.

The runs which are summarized in the following Tables I–IV were carried out in the same way. The indicated times correspond, if nothing special is mentioned, to the heating periods from room temperature till to the switching off of the furnace; they include therefore the times necessary for the heating up. The times necessary for the heating up and cooling down of the utilized furnace can be seen from the graphic description.

Example 2

This run was carried out in a similar manner to Example 1. The tube containing 3.1 g. of white phosphorus and 14.25 g. of methyl bromide was heated up to 230° C. and maintained at this temperature. The heating period amounted to 7 hours (run No. 19, without cooling period). The distillation of the raw distillate (14.9 g.) yielded 9.2 g. of methyldibromophosphine; B.P. 137–150° C./722 mm., and 5.4 g. of $PBr_3$; B.P. 160–175° C./722 mm. The extraction of the residue of distillation (20.5 g.) with alcohol yielded 1.0 g. of an insoluble red-black residue (containing $Br^-$) and 19.5 g. of alcohol-soluble product, which yielded after recrystallization from methanol+ether 10.9 g. of tetramethylphosphonium bromide, $[(CH_3)_4P]^+Br^-$. It is a white, very hygroscopic solid product; M.P. 160–180° C.

*Analysis.*—$C_4H_{12}BrP$, Calc'd percent: Br, 46.73. Found percent: Br, 45.4.

TABLE I

| No. | P:CH$_3$Cl (moles used) | Temperature, ° C. | Hours | Percent CH$_3$ groups in the product | | | Percent CH$_3$Cl consumed |
|---|---|---|---|---|---|---|---|
| | | | | CH$_3$PCl$_2$ | (CH$_3$)$_4$PCl | Total | |
| 1 | 0.258:0.297 | 195 | 5 | 0 | 0 | 0 | 0 |
| 2 | 0.258:0.297 | 195 / 228 | 5 / 5 | 18.3 | 82.2 | 100.5 | 52 |
| 3 | 0.258:0.297 | 230 | 10 | 12.4 | 88.4 | 100.7 | 100 |
| 4 | 0.258:0.297 | 250 | 5 | 10.6 | 89.3 | 100 | 100 |
| 5 | 0.258:0.297 | 300 | 2.5 | 10.4 | 87.0 | 97.4 | 92 |
| 6 | 0.258:0.297 | 306–309 | 5 | 17.7 | 64.6 | 82.3 | 99 |
| 7[1] | 0.258:0.297 | 310 | 5 | 22.8 | 61.5 | 89.1 | 95.3 |
| 8 | 0.149,0.297 | 260 / 310 | 7 / 7 | 8.9 | 87.9 | 96.8 | 94.6 |
| 9 | 0.387:0.594 | 310 | 5 | 20.3 | 71.4 | 97.4 | 100 |
| 10[2] | 0.200:0.297 | 300 | 5 | 18.3 | 83.3 | 101.6 | 94.6 |
| 11 | 0.129:0.297 | 310 | 5 | 4.3 | 81.1 | 85.4 | 89.3 |
| 12[3] | 0.309:0.356 | 290 | 0.5 | 6.3 | 73.7 | 80.0 | 84.4 |
| 13[3] | 0.258:0.297 | 300 | 1 | 4.4 | 91.1 | 95.5 | 66.6 |
| 14[3] | 0.309:0.356 | 310–315 | 2.5 | 8.6 | 93.1 | 101.7 | 95.5 |
| 15[3] | 0.258:0.297 | 303–311 | 3 | 5.1 | 73.8 | 79.0 | 86.6 |
| 16[3] | 0.258:0.297 | 300–310 | 4 | 9.8 | 60.0 | 69.8 | 85.3 |

[1] Contained traces of water.
[2] 0.077 Hole PCl$_3$ added.
[3] Tubes introduced in the furnace at the indicated temperature.
[4] Including 4.74% CH$_3$ in (CH$_3$)$_2$PCl.
[5] Including 5.63% CH$_3$ in (CH$_3$)$_2$PCl.

TABLE II

| No. | P:CH₃Cl (moles used) | Temperature, °C. | Hours | Percent CH₃ groups in the product | | | Percent CH₃Cl consumed |
|---|---|---|---|---|---|---|---|
| | | | | CH₃PCl₂ | (CH₃)₄PCl | Total | |
| 17 | 0.129:0.210 | 260 | 7 | 15 | 85.0 | 100 | 100 |
| 18 | 0.135:0.265 | 230 | 8 | 9.6 | 90.4 | 100 | 100 |
| 19 | 0.200:0.300 | 230 | 8 | 14.9 | 85.1 | 100 | 100 |

TABLE III

| No. | Distillate (B.P. 72–83° C.), grams | Composition in percent according to P³¹ NMR analysis | | |
|---|---|---|---|---|
| | | PCl₃ | CH₃PCl₂ | (CH₃)₂PCl |
| 1 | | | | |
| 2 | 5.0 | 34 | 66 | |
| 3 | 8.4 | 48.4 | 51.6 | |
| 4 | 9.0 | 58.7 | 41.3 | |
| 5 | 8.0 | 58.4 | 41.6 | |
| 6 | 10.5 | 42 | 58 | |
| 7 | 10.8 | 25 | 69 | 6 |
| 8 | 8.6 | 66 | 34 | |
| 9 | 20.7 | 24 | 68.2 | 7.8 |
| 10 | 7.5 | 67 | 33 | |
| 11 | 6.7 | 80 | 20 | |
| 12 | 8.7 | 74.3 | 25.7 | Trace |
| 13 | 4.3 | 76.3 | 23.7 | |
| 14 | 8.3 | 58.4 | 41.6 | |
| 15 | 5.9 | 73.6 | 26.4 | |
| 16 | 6.6 | 55.9 | 44.1 | |

TABLE IV

| No. | Distillate, grams | Composition in percent according to P³¹ NMR analysis | | |
|---|---|---|---|---|
| | | PBr₃ | CH₃PBr₂ | (CH₃)₂PBr |
| 17 | 10 | 45.8 | 54.2 | |
| 18 | 10.3 | 50 | 50 | |
| 19 | 14.6 | 37 | 63 | |

The embodiments of the invention in which an exclusive property or privilege is claimed are defined as follows:

1. A process of preparing quaternary phosphonium halides of the general formula $$[R_4P]^+X^-$$

Wherein R is lower alkyl having 1 to 3 carbon atoms, comprising reacting white phosphorus with an alkyl halide of the formula $$RX$$

wherein R is defined as above and X represents a chlorine, bromine or fluorine atom, under pressure at a temperature in the range of 220° to 400° C.

2. A process of claim 1 wherein white phosphorus and alkyl halide are utilized in a proportion of 1:1 to 1:3.

3. A process of claim 1 wherein X is a chlorine atom.

4. A process of claim 1 wherein X is a bromine atom.

5. A process of claim 1 wherein white phosphorus and methyl chloride are heated in a proportion of 1:1.15 at 250° C. for 3 to 3½ hours and then the reaction mixture is allowed to cool.

6. A process of claim 1 wherein white phosphorus and methyl chloride are heated in a proportion of 1:1.15 at 310° C. for 2½ hours and then the reaction mixture is allowed to cool.

7. A process of claim 1 wherein white phosphorus and methyl bromide are heated in a proportion of 1:2 at 230° C. for 6 hours.

8. A process of claim 1 wherein white phosphorus is sprayed into the reaction vessel at a temperature above about 250° C.

9. A process of claim 2 wherein the alkyl halide is introduced into the reaction vessel at a temperature above about 300° C.

References Cited

UNITED STATES PATENTS 3,060,241  10/1962  Rauhut et al. _____ 260—606.5
3,316,293  4/1967  Carr et al. _____ 260—606.5 X TOBIAS E. LEVOW, *Primary Examiner.*

W. F. W. BELLAMY, *Assistant Examiner.*

U.S. Cl. X.R.

252—8.1, 8.6; 260—543